(12) United States Patent
Bolland

(10) Patent No.: US 7,253,951 B2
(45) Date of Patent: Aug. 7, 2007

(54) VIEWING DEVICE

(75) Inventor: Matthew T. Bolland, Stoughton, WI (US)

(73) Assignee: PlayStar, Inc., Janesville, WI (US)

( * ) Notice: Subject to any disclaimer, the term of this patent is extended or adjusted under 35 U.S.C. 154(b) by 259 days.

(21) Appl. No.: 10/965,080

(22) Filed: Oct. 14, 2004

(65) Prior Publication Data
US 2006/0082871 A1 Apr. 20, 2006

(51) Int. Cl.
G02B 23/08 (2006.01)

(52) U.S. Cl. ............... 359/402; 472/116; 446/219

(58) Field of Classification Search ......... 359/402, 359/403, 894–895; 356/7; 114/327, 340; 42/118; D21/483, 573; 472/116; 446/219
See application file for complete search history.

(56) References Cited

U.S. PATENT DOCUMENTS

| 1,635,011 | A |   | 7/1927  | Sadler   |       |
|-----------|---|---|---------|----------|-------|
| 1,837,208 | A |   | 12/1931 | Cover    |       |
| 2,909,959 | A | * | 10/1959 | Girden   | 2/427 |
| D272,924  | S |   | 3/1984  | Sahler   |       |
| 4,868,588 | A |   | 9/1989  | Hajnal   |       |
| 4,887,893 | A |   | 12/1989 | Dahlgren |       |
| 4,911,673 | A |   | 3/1990  | Hollowell |      |
| 5,469,236 | A |   | 11/1995 | Roessel  |       |
| 5,526,177 | A |   | 6/1996  | Fantone  |       |
| D374,879  | S |   | 10/1996 | Kung     |       |
| D391,278  | S |   | 2/1998  | Kung     |       |
| D401,977  | S |   | 12/1998 | Wong     |       |
| 5,886,839 | A |   | 3/1999  | Arnone et al. |  |
| 5,943,163 | A |   | 8/1999  | Tartaglia |      |
| D418,187  | S |   | 12/1999 | McLane et al. |  |
| 6,122,100 | A |   | 9/2000  | Miller   |       |
| D460,771  | S |   | 7/2002  | Kung     |       |
| 2001/0013346 | A1 | * | 8/2001 | Lemke | 128/201.11 |
| 2002/0185049 | A1 | * | 12/2002 | Broderick et al. | 114/264 |

FOREIGN PATENT DOCUMENTS

SE     8703712 A  *  3/1989

OTHER PUBLICATIONS

Admitted Prior Art Headstrom Periscope (Date Unknown), pp. 1-7.
Admitted Prior Art (Manufacturer Unknown) Yellow Periscope (Date Unknown), pp. 1-4.

(Continued)

Primary Examiner—Mark A. Robinson
Assistant Examiner—Lee Fineman
(74) Attorney, Agent, or Firm—Michael Best & Friedrich LLP

(57) ABSTRACT

A viewing device includes a housing defining an interior chamber through which light can pass. The housing includes first and second spaced apart openings communicating with the interior chamber such that light entering the first opening is viewed by a user looking into the second opening. The second opening is further configured to receive sound created by the user and the housing is configured to transmit the sound entering the second opening toward a sound exit location of the housing at or near the first opening. The second opening can define an eyepiece portion into which the user looks and a mouthpiece portion into which a user speaks. The viewing device can take the form of a periscope toy.

61 Claims, 5 Drawing Sheets

OTHER PUBLICATIONS

Admitted Prior Art Periscopes—PlaysetParts.com (Date Unknown), pp. 1-2.
Admitted Prior Art (Manufacture Unknown) Super Spy Periscope (Date Unknown), p. 1.
The Grandparent's Toy Collection 2003-2004 Catalog, [online], [retrieved on Oct. 12, 2005] Retrieved from Google Catalog Search using Internet URL:http://catalog.google.com/ctalogs?dq=&hl=en&lr=&issue=23917&catpage=30&zoom=1 p. 30.

* cited by examiner

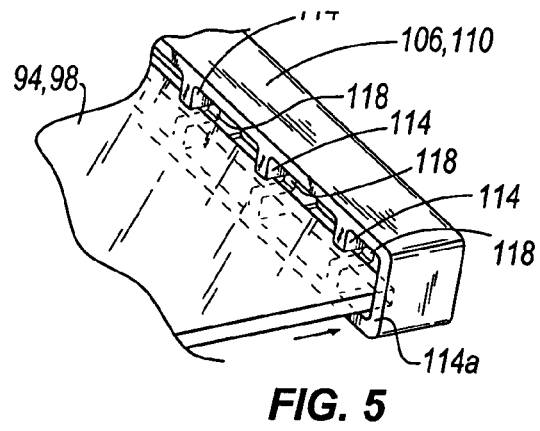
FIG. 5
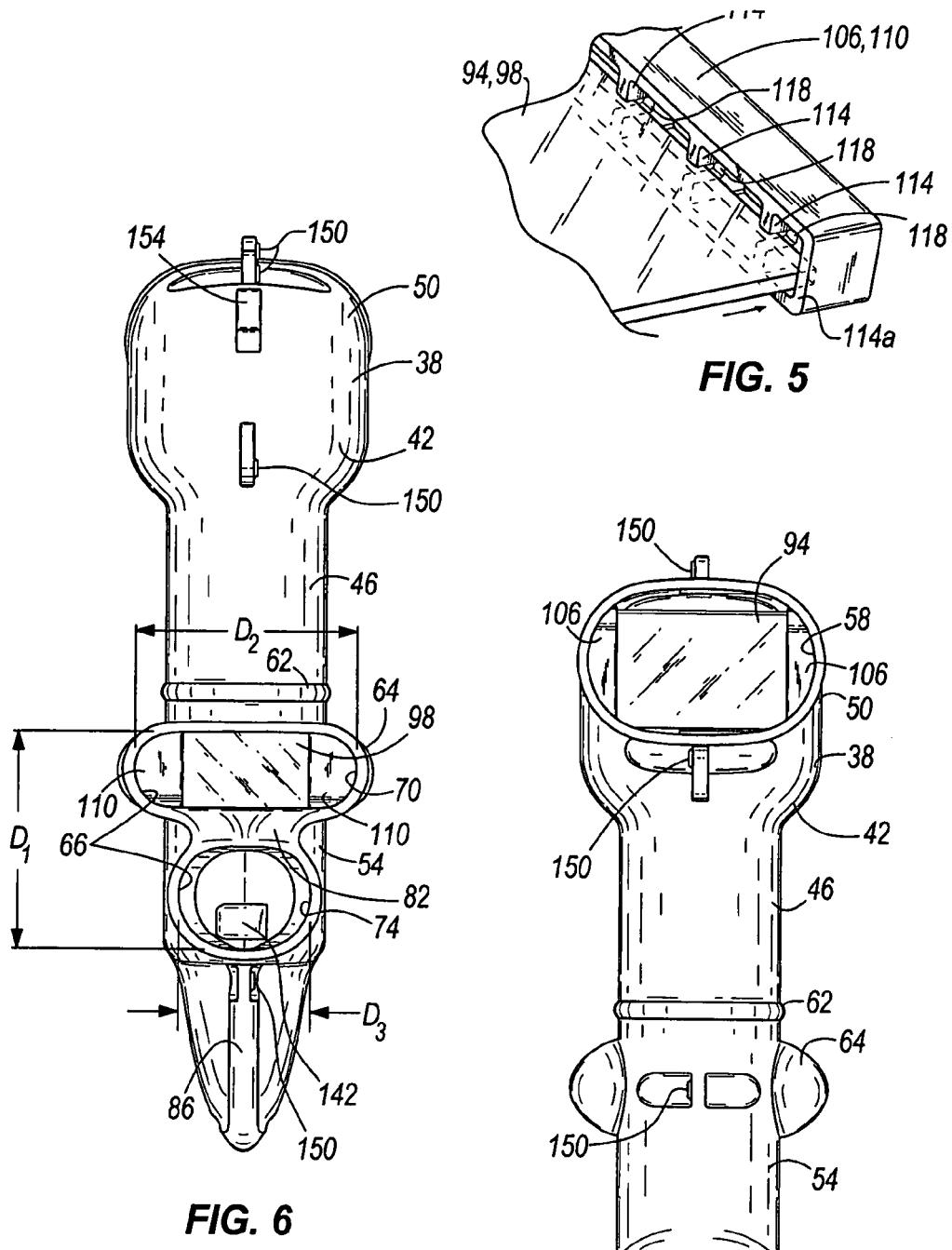
FIG. 6
FIG. 7

VIEWING DEVICE

FIELD OF THE INVENTION

The invention relates to viewing devices, and more particularly to children's viewing toys such as periscope toys, telescope toys, and binocular toys.

BACKGROUND OF THE INVENTION

Viewing devices such as periscope toys, binocular toys, and telescope toys are commonly enjoyed by children. Generally, these toys take the form of a tubular optical instrument containing lenses and/or mirrors. In a periscope toy, the mirrors are arranged to allow the child to look into one portion of the periscope toy that may be generally hidden or obstructed from view and observe objects that would not otherwise be observable from the child's hidden location. Often times, such periscope toys are adapted to be mounted to children's playstations.

SUMMARY OF THE INVENTION

The invention provides an improved viewing toy configured to enable the user to both view objects and project sound (e.g., his or her voice) in the direction of the objects being viewed. In one embodiment, the invention provides an improved periscope toy that allows a child to view objects from a generally hidden or obstructed location and project sound in the direction of the objects being viewed.

More specifically, the invention provides a viewing device including a housing defining an interior chamber through which light can pass. The housing includes first and second spaced apart openings communicating with the interior chamber such that light entering the first opening is viewed by a user looking into the second opening. The second opening is further configured to receive sound created by the user and the housing is configured to transmit the sound entering the second opening toward a sound exit location of the housing at or near the first opening.

In another embodiment, the invention provides a viewing device including a housing having a first end portion and a second end portion and defining an interior chamber. The housing includes a light receiving opening adjacent the first end portion and that is in communication with the interior chamber, and a viewing opening adjacent the second end portion and that is in communication with the interior chamber. A light directing member is positioned within the interior chamber for directing light entering the light receiving opening toward the second end portion of the housing. The housing further includes a mouthpiece opening adjacent the viewing opening such that sound created orally by a user looking into the viewing opening is received into the housing through the mouthpiece opening and exits the housing at or near the light receiving opening.

In another embodiment, the invention provides a viewing device comprising a housing having a first end portion and a second end portion, and means for simultaneously transmitting light and sound in opposite directions along respective paths within the housing such that light entering the first end portion of the housing is transmitted to the second end portion of the housing and sound entering the second end portion of the housing is transmitted to the first end portion of the housing.

In yet another embodiment, the invention provides a playstation including a support structure and a toy movably coupled to the support structure. The toy includes a housing having a first end portion and a second end portion and defining an interior chamber such that sound created by a user enters the second end portion of the housing, is transmitted to the first end portion of the housing through the interior chamber, and can be projected from the first end portion in multiple directions depending on the orientation of the toy with respect to the support structure.

In a further embodiment, the invention provides a periscope toy including a housing having a first end portion and a second end portion and defining an interior chamber. The housing also includes a light receiving opening adjacent the first end portion and that is in communication with the interior chamber, and a viewing opening adjacent the second end portion and that is in communication with the interior chamber. A mirror is positioned within the interior chamber for directing light entering the light receiving opening toward the viewing opening. A mouthpiece opening is located adjacent the viewing opening such that sound created orally by a user looking into the viewing opening is received into the housing through the mouthpiece opening and exits the housing through the light receiving opening. The mouthpiece opening and the viewing opening are at least partially separated by a wall portion.

Other features and advantages of the invention will become apparent to those skilled in the art upon review of the following detailed description, claims, and drawings.

BRIEF DESCRIPTION OF THE DRAWINGS

FIG. 5 is an enlarged partial view illustrating a mirror mount within the periscope toy.

FIG. 6 is a rear view of the periscope toy of FIG. 1.

FIG. 7 is a front view of the periscope toy of FIG. 1.

Figure 1:
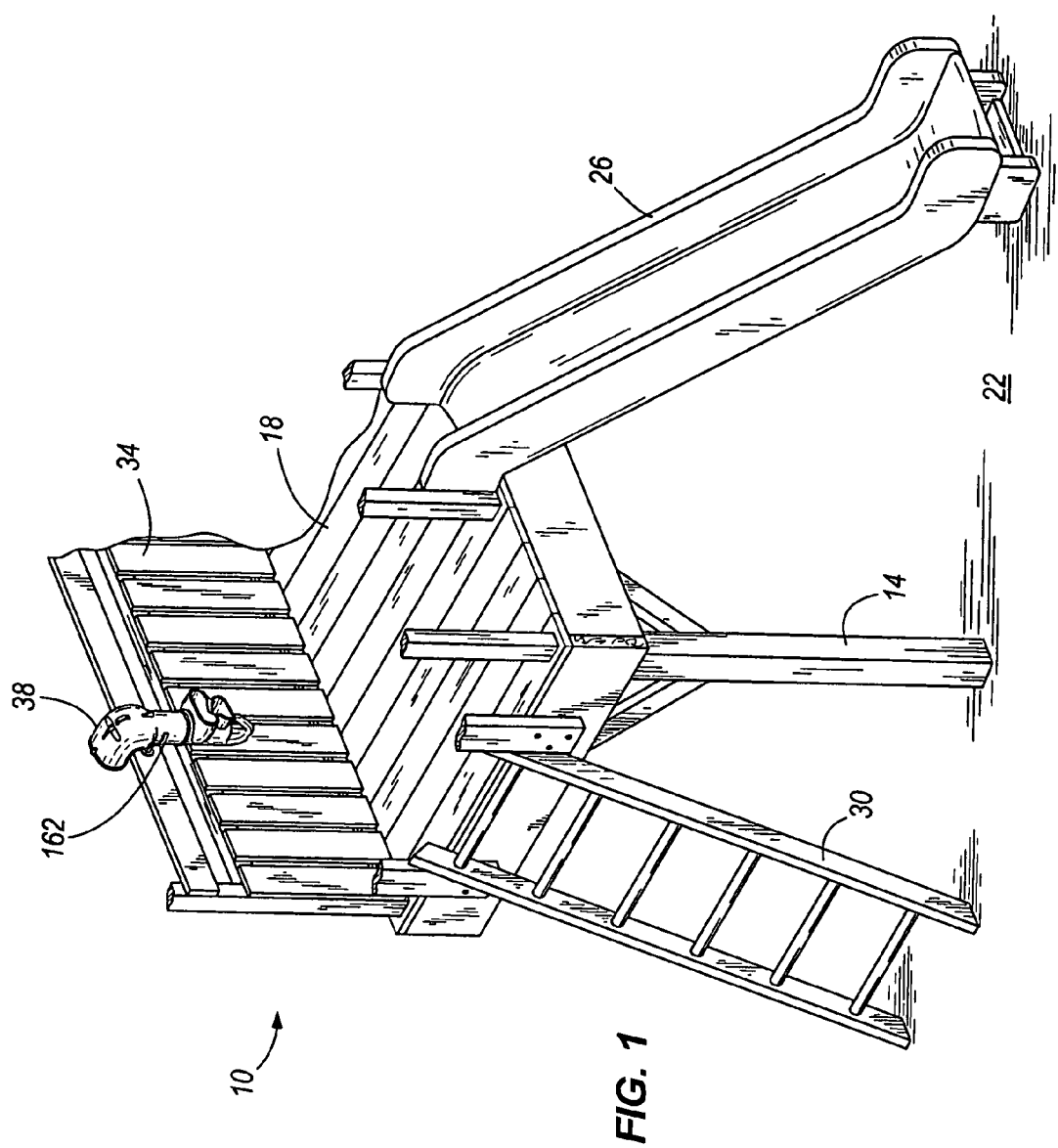
FIG. 1 is a partial perspective view of a playstation including a periscope toy embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having" and "comprising" and variations thereof herein is meant to encompass the items listed thereafter and equivalents thereof as well as additional items.

DETAILED DESCRIPTION

FIG. 1 illustrates a playstation 10 of the type typically used by children for recreational play. The playstation 10 includes a plurality of legs 14 (only one is shown) that support an elevated support structure or platform 18 above a lower support surface, such as the ground 22. As shown, a slide 26 may be coupled to the playstation 10 to allow children to slide from the platform 18 down to the ground 22. A climbing ladder 30 is coupled to the playstation 10 to provide a way for children to climb from the ground 22 up to the platform 18. Of course, other configurations of ladders, steps, or climbing panels can also be used. While not shown, other rides and climbing features (e.g., swings, monkey bars, etc.) can also be coupled to the playstation 10.

The illustrated playstation 10 includes a wall 34 supported on the platform 18. A viewing device in the form of a periscope toy 38 is coupled to the wall 34. As will be explained in greater detail below, the periscope toy 38 enables a child using the playstation 10 to remain generally hidden behind the wall 34 while looking at objects spaced a distance from the playstation 10 that might not otherwise be observable from the child's hidden location behind the wall 34. In addition, the periscope toy 38 enables the child to project sound (e.g., his or her voice) in the direction of the objects being viewed. Of course, and as will also be discussed below, the periscope toy 38 need not be mounted to the wall 34, but can be separately carried and used by a child as desired. Those skilled in the art will understand that the invention can also encompass telescope toys, binocular toys, and other viewing devices.

Figure 4:
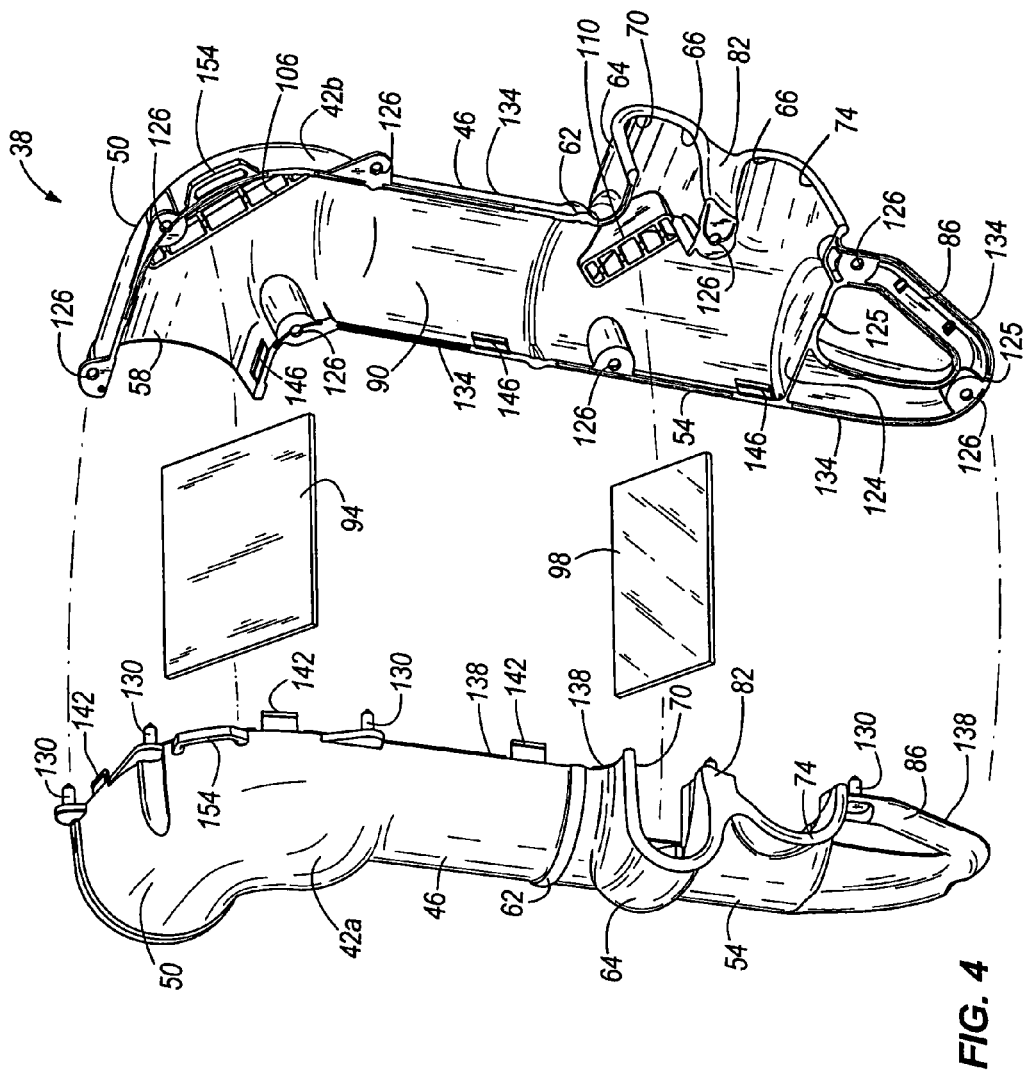
FIG. 4 is an exploded view of the periscope toy of FIG. 1.

Referring now to FIGS. 2-8, the illustrated periscope toy 38 includes a two-piece housing 42 defining first and second housing halves 42a and 42b, respectively (see FIG. 4). For the purposes of discussion, the first half 42a will be referred to as the left half and the second half 42b will be referred to as the right half. The assembled housing 42 defines an intermediate or body portion 46 extending between a first end portion 50 of the housing 42 and a second end portion 54 of the housing 42.

Figure 8:
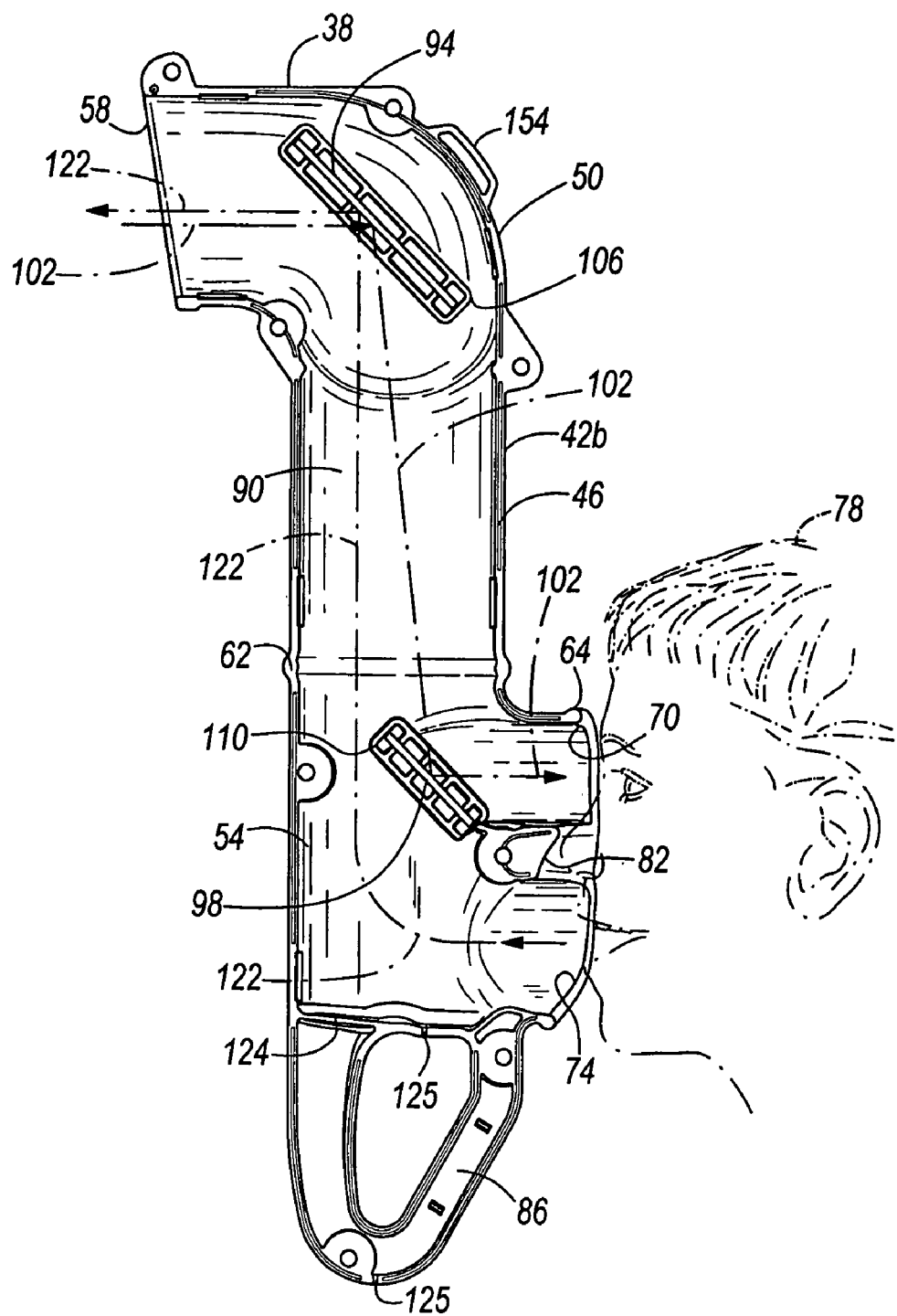
FIG. 8 is a side view of the periscope toy with half of the housing removed to illustrate the light and sound pathways within the periscope toy.

The first end portion 50 of the housing 42 defines an elbow-shaped or bent portion of the housing 42 coupled at one end to the body portion 46 and terminating at the other end in a first opening 58. As best shown in FIG. 8, when the periscope 38 is oriented in a generally upright orientation, the first end portion 50 is configured to define an overhang for the first opening 58 to help prevent rain, snow, or falling debris from entering the first opening 58 and collecting within the housing 42.

The body portion 46 is illustrated as being generally cylindrical and extends from the first end portion 50 toward the second end portion 54. In the illustrated embodiment, a raised rib 62 is formed at an interface between the body portion 46 and the second end portion 54. The purpose of the raised rib 62 will be explained in detail below.

The second end portion 54 extends generally coaxially with the body portion 46 and includes an extension portion 64 extending generally perpendicularly to the axis of the body portion 46. The terminal end of the extension portion 64 defines a second opening 66. In the illustrated embodiment, the second opening 66 defines an eyepiece portion or opening 70 and a mouthpiece portion or opening 74 each formed in the extension portion 64 and each respectively sized and configured to enable a user 78 (see FIG. 8) using the periscope 38 to look into the eyepiece opening 70 and speak into the mouthpiece opening 74, as will be described in greater detail below.

Figure 2:
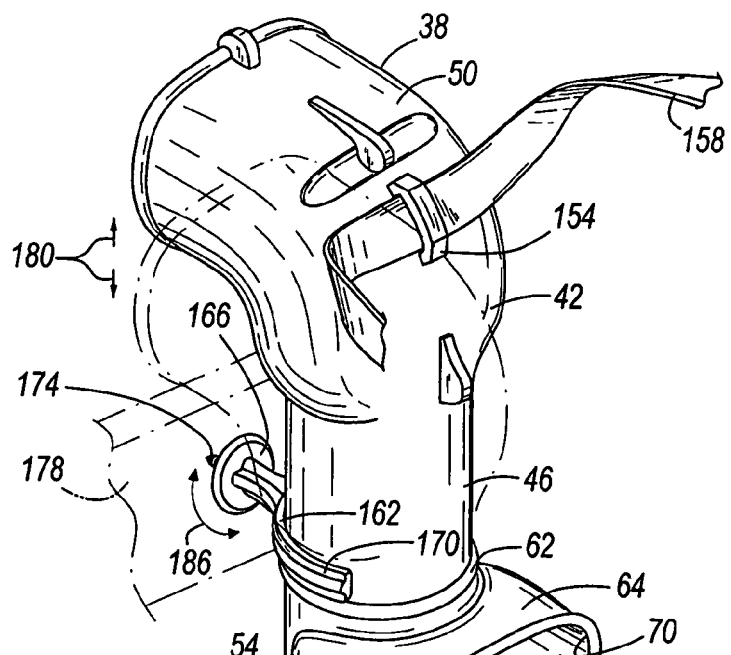
FIG. 2 is a rear perspective view of the periscope toy of FIG. 1.
Figure 3:
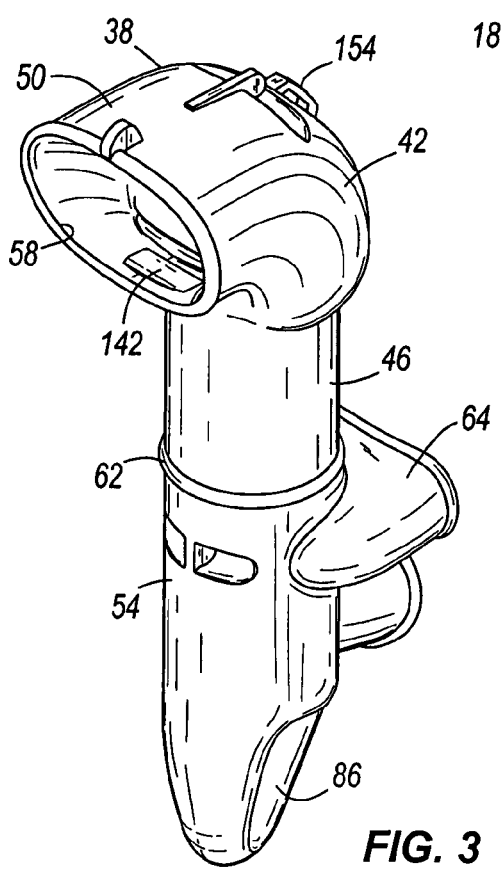
FIG. 3 is a front perspective view of the periscope toy of FIG. 1.

As best shown in FIGS. 2, 4, and 6, a wall portion 82 divides the eyepiece opening 70 and the mouthpiece opening 74. The wall portion 82 is contoured to comfortably receive the nose of the user 78 (see FIG. 8). However, it should be understood that while the illustrated second opening 66 is divided into a separate eyepiece opening 70 sized to substantially surround or accept both of the user's eyes and a separate mouthpiece opening 74 sized to substantially surround or accept the user's mouth, this need not be the case, and a single opening large enough to substantially surround or accept the user's eyes and mouth is also contemplated. As used herein and in the appended claims, the phrase that the opening 66 (or the combined eyepiece opening 70 and mouthpiece opening 74) is "sized to substantially surround" or is "sized to substantially accept" both of the user's eyes and the user's mouth, is intended to mean that the opening is large enough such that when the user 78 positions his or her face closely adjacent the opening 66 as shown in FIG. 8, the user's eyes and mouth are positioned within an area circumscribed by the distal end of the extension portion 64 defining the second opening 66.

With reference to FIG. 6, the second opening 66 defines a distance D1 ranging from about ten centimeters to about twelve centimeters and more preferably from about eleven and one-half centimeters to about twelve centimeters. In the illustrated embodiment, the distance D1 is about 11.7 centimeters. The eyepiece opening 70 defines a distance D2 ranging from about eleven centimeters to about thirteen centimeters, and more preferably from about eleven and one-half centimeters to about twelve and one-half centimeters. In the illustrated embodiment, the distance D2 is about twelve centimeters. The mouthpiece opening 74 defines a distance D3 ranging from about six centimeters to about eight centimeters, and more preferably from about seven centimeters to about eight centimeters. In the illustrated embodiment, the distance D3 is about 7.3 centimeters.

The housing 42 also includes a handle portion 86 adjacent the second end portion 54 to enable the user 78 to manipulate and/or carry the periscope 38 as desired. It should be understood that the illustrated handle configuration represents only one possible handle configuration and location. Other common handle configurations and locations, such as a configuration including two oppositely-extending handles or tabs on either side of the housing 42, are also contemplated. Additionally, the handle portion 86 can be completely eliminated so that the user 78 will carry and manipulate the periscope without the aid of a handle.

When assembled, the left and right housing halves 42a and 42b define an interior chamber 90 (see FIGS. 4 and 8) that extends between the first opening 58 to the second opening 66. In the illustrated embodiment, the first and second openings 58, 66, (or at least the first opening 58 and the mouthpiece opening 74) are open to allow communication between the interior chamber 90 and the atmosphere. In other words, no covering structure (e.g., a plastic plate or lens) covers or closes the openings 58, 66 in a manner that would inhibit the transmission of sound into or out of the openings 58, 66.

As best illustrated in FIG. 8, the interior chamber 90 defines a non-linear internal passageway. In other words, there is substantially no straight-line path from the first opening 58 to the second opening 66 through the interior chamber 90. In order for light and sound to travel between the first and second openings 58, 66, the light and sound must be re-directed at least once, and in the illustrated construction, must be re-directed at least two times. Of course, if the viewing device takes the form of a telescope toy or binocular toy, the light and sound need not be re-directed within the housing at all, but rather can pass through along a generally linear pathway (taking into account of course any minor bending or re-directing of the light associated with a magnification process, if any).

The periscope 38 is operable to enable a user 78 to look into the eyepiece opening 70 to see objects visible due to light entering the first opening 58. To direct the light rays from the first opening 58 to the eyepiece opening 70, the illustrated periscope 38 includes first and second light directing members in the form of mirrors 94 and 98, respectively. The mirrors 94, 98 are retained between the halves 42*a* and 42*b* of the housing 42 at the appropriate orientation to direct light along the pathway generally depicted by the dashed lines 102 in FIG. 8. Light entering the first opening 58 strikes the mirror 94 and is re-directed toward the second end portion 54 of the housing 42. The light continues to travel through the interior chamber 90 and is received by the mirror 98 and further directed toward the eyepiece opening 70. In the illustrated embodiment, the mirrors 94, 98 are made from material sold under the trademark Lexan. Mirrors made from this material have proven to be durable and resistant to the elements (e.g., resistant to "yellowing" due to exposure to the sun). However, other suitable materials for the mirrors 94, 98 can also be used.

It should also be understood that while in the illustrated embodiment the light directing members are mirrors 94 and 98, other light directing members (e.g., lenses, prisms, filters, and the like) known for reflecting, directing, magnifying, transmitting, or focusing light can be substituted for or used in conjunction with the mirrors 94, 98. For example, if the viewing device takes the form of a telescope or binocular toy, it may include one or more lenses to magnify the light. Alternatively, some telescope or binocular toys simply include clear plastic lenses that do not actually magnify the light, but rather only transmit the light. Nonetheless, these toys resemble telescopes or binoculars. As used herein and in the appended claims, when used to describe action taken with light, the terms "direct" and "directing" encompasses guiding the light, reflecting the light, magnifying the light, focusing the light, or allowing the light to transmit or pass through.

As best shown in FIGS. 4, 5, and 8, each housing half 42*a*, 42*b* includes first and second mirror mounts 106 and 110, respectively, for receiving and supporting an edge of the respective mirror 94, 98. In the illustrated embodiment, the mirror mounts 106, 110 are integrally formed with the housing halves 42*a*, 42*b* and each includes a plurality of parallel ribs 114. With reference to FIG. 5, except for at least one end rib 114*a* on any given mount 106, 110, each rib 114 includes a notch or recess 118 formed therein for receiving an edge of the mirror 94, 98. The notch-less end ribs 114*a* substantially prevent the mirrors 94, 98 from sliding within the mounts 106, 110.

The periscope 38 is also configured to enable the user 78 to project sound toward the objects being viewed. Therefore, the periscope toy 38 includes means for simultaneously transmitting light and sound in opposite directions along respective paths within the housing 42 such that light entering the first end portion 50 of the housing 42 is transmitted to the second end portion 54 of the housing 42, and sound entering the second end portion 54 of the housing 42 is transmitted to the first end portion 50 of the housing 42. The mouthpiece opening 74 allows a user 78 to speak, yell, or otherwise vocalize into the periscope 38 simultaneously with viewing. The sound generated by the user 78 enters the second end portion 54 of the housing 42 through the mouthpiece opening 74, passes behind the mirror 98, and travels through the interior chamber 90 generally along the non-linear pathway depicted by the dashed lines 122 in FIG. 8. Again, if the viewing device takes the form of a telescope toy or binocular toy, the sound need not be re-directed within the housing at all.

In the illustrated embodiment, the mirror mounts 110 are positioned to minimize or eliminate any gap between the bottom edge of the mirror 98 and the wall portion 82 separating the eyepiece opening 70 and the mouthpiece opening 74. This substantially prevents sound introduced by the user 78 from immediately exiting the housing 42 via the eyepiece opening 74. Furthermore, the housing 42 includes a wall portion 124 that separates the handle portion 86 from the remainder of the interior chamber 90 so that sound introduced into the second opening 66 is directed toward the first opening 58 and not into the handle portion 86. Drains 125 in the wall portion 124 and the handle portion 86 allow any water that enters into the interior chamber 90 to drain from the housing 42.

While the illustrated periscope 38 is configured such that the light and sound both travel through a common, substantially undivided interior chamber 90, those skilled in the art will understand that separate interior chambers could be formed within the housing 42 such that the light travels through a first chamber and the sound travels through a second chamber. The two separate chambers could be formed by placing a baffle in the illustrated interior chamber 90, or could be formed using two distinct, yet interconnected tubular housings. Additionally, those skilled in the art will understand that while the illustrated periscope 38 allows the sound to exit the housing 42 via the first opening 58, the sound could alternatively be routed to exit at an alternative sound exit location distinct from, yet near, the first opening 58 (e.g., through an opening positioned below the first opening 58).

Assembly of the periscope 38 will now be described. The mirrors 94 and 98 are positioned adjacent their respective mirror mounts 106 and 110 such that when the housing halves 42*a* and 42*b* are brought together, the mirrors are captured and retained in position between the housing halves 42*a*, 42*b* without the need for glue or other bonding agents.

The housing halves 42*a*, 42*b* are designed with several features that facilitate aligning and securing the two housing halves together. In the illustrated embodiment, and as best seen in FIG. 4, the right housing half 42*b* includes a plurality of apertures 126 formed at various locations about the perimeter of the housing half 42*b*. The apertures 126 are positioned and configured to receive a plurality of corresponding posts 130 formed on the left housing half 42*a*. With the posts 130 received in the apertures 126, the housing halves 42*a* and 42*b* are moved together. The engagement of the posts 130 within the apertures 126 guides the housing halves 42*a*, 42*b* together.

The right housing half 42*b* further includes a plurality of grooves 134 formed along the perimeter. The grooves 134 receive corresponding tongue portions 138 extending from the perimeter of the left housing half 42*a* when the halves 42*a*, 42*b* are brought together. While not shown, the right housing half 42*b* can also include additional recesses that receive corresponding projections in the left housing half 42*a* at various other locations around the perimeter of the housing halves 42*a*, 42*b*. For example, such features can be positioned adjacent the openings 58, 70, and 74.

Furthermore, the left housing half 42*a* includes a plurality of resilient tabs 142 that extend into and engage corresponding notches 146 formed in the right housing half 42*b*. Together, all of these features aid in alignment and securement of the two housing halves 42*a*, 42*b* together. Of course, those skilled in the art will understand that other types of alignment and securement features can be substituted for or used in addition to the illustrated features.

Once the housing halves 42*a*, 42*b* are assembled together, they can be secured by ultrasonically welding or thermally staking each post 130 into a button-shaped head 150 (see FIGS. 6 and 7) that is larger than the apertures 126 so that the halves 42a, 42b cannot be separated. Of course, other suitable techniques can also be used to deform the posts 130 into the button-shaped heads 150.

With this method, the housing halves 42a, 42b can be secured together without requiring gluing or bonding along the mating perimeters of the housing halves 42a, 42b. In the illustrated embodiment, this assembly method is useful because it facilitates the use of molded, high-impact polypropylene plastic, which is extremely durable and well-suited for withstanding the anticipated use and abuse by children using the periscope 38, but which is not particularly suitable for gluing. Of course, other means for assembling the housing halves 42a, 42b are also contemplated, and other suitable plastic materials can be used, which may require modifications to the assembly method and alignment/securement features discussed above. For example, other plastic materials that are more receptive to gluing or other bonding methods could be used, and the mating perimeter halves could be bonded together.

As mentioned above, the housing halves 42a, 42b are made from molded plastic. In the illustrated embodiment, the housing 42 includes an integrally molded loop 154 configured to receive an optional carrying strap 158 (see FIG. 2). The molds used to create the housing halves 42a, 42b can be interchangeably altered as desired to form or eliminate the loop 154 during molding. Of course, the loop could also be a separate part attached to the housing 42 after the molding process.

While the periscope 38 can be carried via the handle portion 86 or the carrying strap 158, it can also be mounted to a playstation 10 or other suitable support structure as shown in FIGS. 1 and 2. Referring to FIG. 2, a mounting member 162 includes a base portion 166 and a U-shaped portion 170 coupled to the base portion 166. A fastener such as a lag bolt 174 is received within a bore (not shown) in the base portion 166 and can be secured into a support member 178.

The body portion 46 of the housing 42 is sized to snap into the U-shaped portion 170 of the mounting member 162 to support the periscope 38 in the mounted mounting member 162. As illustrated in FIG. 2, when the periscope 38 is mounted in the mounting member 162, the periscope can translate between a first position (shown in solid lines in FIG. 2) and a second position (shown in phantom lines in FIG. 2) as indicated by the arrows 180. The enlargement of the first end portion 50 with respect to the diameter of the body portion 46 provides a first stop for translation of the housing 42 within the mounting member 162, and the raised rib 62 provides a second stop for translation of the housing 42 within the mounting member 162. In an alternative construction, the raised rib 62 could be eliminated and the extension portion 64 would act as the second stop.

The engagement between the U-shaped portion 170 of the mounting member 162 and the body portion 46 also permits rotation of the housing 42 within the mounting member 162 as indicated by the arrows 182. This rotation capability greatly expands the viewing field and sound directing options for the periscope 38. Furthermore, if the lag bolt 174 is not secured too tightly, the mounting member 162 can also be pivoted with respect to the support member 178 as indicated by the arrows 186. This pivoting capability also expands the viewing field and sound directing options for the user 78. While the mounting member 162 provides great flexibility for mounting and using the periscope 38, it is to be understood that other suitable mounting devices and arrangements can also be substituted.

It should also be understood that the periscope toy 38 of the present invention can be modified to various other configurations without deviating from the scope of the invention. Specifically, while the housing 42 is configured and oriented in the generally upright orientation as shown in the figures, it could also be reconfigured and reoriented as desired to provide different viewing and sound projecting arrangements. For example, it may be desired to simply include one bend in the periscope toy 38 such that only a single mirror is needed to direct the light through the interior chamber. Alternatively, the periscope toy could be reconfigured to include more than two bends, requiring more than two mirrors. In another alternate configuration, the periscope could be reoriented such that the user views and speaks into the upper end of the periscope to view objects and direct sound through an opening below the user's eyes and mouth. Additionally, the invention can also be embodied in a telescope toy or a binocular toy, as mentioned and explained above.

Various features of the invention are set forth in the following claims.

The invention claimed is:

1. A viewing device comprising:
   a housing defining an interior chamber through which light can pass, the housing including;
      first and second spaced apart openings communicating with the interior chamber such that light entering the first opening is viewed by a user looking into the second opening, the second opening further configured to receive sound created by the user, the housing configured to transmit the sound entering the second opening toward a sound exit location of the housing at or near the first opening;
   wherein the second opening defines an eyepiece portion into which the user looks and a mouthpiece portion into which the user speaks, the eyepiece portion at least partially defined by housing wall portions forming an outer periphery of the second opening and spaced apart by a width D2, the mouthpiece portion at least partially defined by housing wall portions forming an outer periphery of the second opening and spaced apart by a width D3, the width D2 being substantially greater than the width D3.

2. The viewing device of claim 1, wherein the second opening is sized to substantially accept both of the user's eyes and the user's mouth.

3. The viewing device of claim 1, further including a wall portion dividing the eyepiece portion from the mouthpiece portion.

4. The viewing device of claim 3, wherein the wall portion is contoured to receive a nose of the user.

5. The viewing device of claim 1, wherein sound entering the second opening travels within the interior chamber to the sound exit location.

6. The viewing device of claim 1, wherein sound exits the housing through the first opening.

7. The viewing device of claim 6, wherein both of the first and second openings are substantially uncovered to allow communication between, the interior chamber and the atmosphere.

8. The viewing device of claim 1, further including a light directing member positioned within the interior chamber and operable to direct light entering the first opening toward the second opening.

9. The viewing device of claim 8, wherein the light directing member is a mirror.

10. The viewing device of claim 8, further including a second light directing member positioned within the interior chamber for receiving light directed by the first light directing member and for directing the light toward the second opening.

11. The viewing device of claim 1, further including a handle coupled to the housing adjacent the second opening.

12. The viewing device of claim 1, further including a mounting member coupled to the housing between the first and second openings, the mounting member configured to be mounted to a support structure and to permit movement of the housing relative to the support structure.

13. The viewing device of claim 12, wherein the support structure is a children's playstation.

14. The viewing device of claim 1, wherein the viewing device is a periscope toy.

15. A viewing device comprising:
a housing having a first end portion and a second end portion and defining an interior chamber, the housing having a light receiving opening adjacent the first end portion and in communication with the interior chamber, and a viewing opening adjacent the second end portion and in communication with the interior chamber;
a light directing member positioned within the interior chamber for directing light entering the light receiving opening toward the second end portion of the housing; and
a mouthpiece opening adjacent the viewing opening such that sound created orally by a user looking into the viewing opening is received into the housing through the mouthpiece opening and exits the housing at or near the light receiving opening;
wherein the mouthpiece opening and the viewing opening are at least partially separated by a wall portion.

16. The viewing device of claim 15, wherein the wall portion is contoured to receive a nose of the user.

17. The viewing device of claim 15, wherein sound entering the mouthpiece opening travels within the interior chamber prior to exiting the housing at or near the light receiving opening.

18. The viewing device of claim 15, wherein sound exits the housing through the light receiving opening.

19. The viewing device of claim 18, wherein both of the light receiving opening and the mouthpiece opening are substantially uncovered to allow communication between the interior chamber and the atmosphere.

20. The viewing device of claim 15, wherein the light directing member is a mirror.

21. The viewing device of claim 15, wherein the light directing member directs light along a non-linear path within the interior chamber.

22. The viewing device of claim 15, further including a second light directing member positioned within the interior chamber for receiving light directed by the first light directing member and for further directing the light toward the viewing opening.

23. The viewing device of claim 15, further including a handle coupled to the housing adjacent the viewing opening.

24. The viewing device of claim 15, further including a mounting member coupled to the housing between the light receiving opening and the viewing opening, the mounting member configured to be mounted to a support structure and to permit movement of the housing relative to the support structure.

25. The viewing device of claim 24, wherein the support structure is a children's playstation.

26. The viewing device of claim 15, wherein the viewing device is a periscope toy.

27. A viewing device comprising:
a housing having a first end portion and a second end portion; and
means for simultaneously transmitting light and sound in opposite directions along respective paths within the housing such that light entering the first end portion of the housing is transmitted to the second end portion of the housing and sound entering the second end portion of the housing is transmitted to the first end portion of the housing;
wherein the means for simultaneously transmitting light and sound includes a first opening in the first end portion that permits the entry of light and the exit of sound, and a second opening in the second end portion that permits entry of sound and exit of light;
wherein the second opening defines an eyepiece portion into which a user looks and a mouthpiece portion into which a user speaks; and
further including a wall portion at least partially dividing the eyepiece portion from the mouthpiece portion.

28. The viewing device of claim 27, wherein the wall portion is contoured to receive a nose of the user.

29. The viewing device of claim 27, wherein the means for simultaneously transmitting light and sound includes a single chamber in the housing through which the light and sound travels.

30. The viewing device of claim 27, wherein the means for simultaneously transmitting light and sound includes a light directing means positioned within the housing for directing light entering the first end portion toward the second end portion.

31. The viewing device of claim 30, wherein the light directing means is a mirror.

32. The viewing device of claim 30, wherein the means for simultaneously transmitting light and sound further includes a second light directing means positioned within the housing for receiving light directed by the first light directing means and for further directing the light toward the second end portion.

33. The viewing device of claim 27, further including mounting means coupled to the housing between the first and second end portions, the mounting means configured to be mounted to a support structure and to permit movement of the housing relative to the support structure.

34. The viewing device of claim 33, wherein the support structure is a children's playstation.

35. The viewing device of claim 33, further including handle means coupled with the housing for manipulating the orientation and position of the housing with respect to the support structure.

36. The viewing device of claim 27, wherein the viewing device is a periscope toy.

37. A playstation comprising:
a support structure; and
a toy movably coupled to the support structure, the toy including a housing having a first end portion and a second end portion, and defining an interior chamber such that sound created by a user enters the second end portion of the housing, is transmitted to the first end portion of the housing through the interior chamber, and can be projected from the first end portion in multiple directions depending on the orientation of the toy with respect to the support structure;
wherein the toy is a viewing toy configured to permit a child to simultaneously look and speak into the second end portion to both view objects and project sound toward the objects; and
wherein the second end portion includes an eyepiece portion into which the user looks and a mouthpiece portion into which a user speaks, the eyepiece portion at least partially defined by housing wall portions forming an outer periphery of the second end portion and spaced apart by a width D2, the mouthpiece portion at least partially defined by housing wall portions forming an outer periphery of the second end portion and spaced apart by a width D3, the width D2 being substantially greater than the width D3.

38. The playstation of claim 37, further comprising a mounting member coupled to the support structure for movably supporting the toy.

39. The playstation of claim 38, wherein the mounting member permits translation and rotation of the toy with respect to the support structure.

40. The playstation of claim 37, wherein the second end portion includes a mouthpiece opening sized to generally surround a mouth of a user, the mouthpiece opening including a wall portion contoured to receive a nose of the user.

41. The playstation of claim 37, further including a wall portion dividing the eyepiece portion from the mouthpiece portion.

42. The playstation of claim 41, wherein the wall portion is contoured to receive a nose of the user.

43. The playstation of claim 37, further including a light directing member positioned within the interior chamber for directing light entering the first end portion toward the second end portion.

44. The playstation of claim 43, wherein the light directing member is a mirror.

45. The playstation of claim 37, wherein the viewing toy is a periscope toy.

46. The playstation of claim 37, further including a slide coupled to the support structure.

47. A periscope toy comprising:
a housing having a first end portion and a second end portion and defining an interior chamber, the housing having a light receiving opening adjacent the first end portion and in communication with the interior chamber, and a viewing opening adjacent the second end portion and in communication with the interior chamber;
a mirror positioned within the interior chamber for directing light entering the light receiving opening toward the viewing opening; and
a mouthpiece opening adjacent the viewing opening such that sound created orally by a user looking into the viewing opening is received into the housing through the mouthpiece opening and exits the housing through the light receiving opening;
wherein the mouthpiece opening and the viewing opening are at least partially separated by a wall portion.

48. The periscope toy of claim 47, wherein the wall portion is contoured to receive a nose of the user.

49. The periscope toy of claim 47, wherein sound entering the mouthpiece opening travels within the interior chamber prior to exiting the housing through the light receiving opening.

50. The periscope toy of claim 49, wherein both of the light receiving opening and the mouthpiece opening are substantially uncovered to allow communication between the interior chamber and the atmosphere.

51. The periscope toy of claim 47, further including a handle coupled to the housing at the second end portion.

52. The periscope toy of claim 47, further including a mounting member coupled to the housing between the light receiving opening and the viewing opening, the mounting member configured to be mounted to a children's playstation and to permit movement of the housing relative to the playstation.

53. A playstation comprising:
a support structure; and
a toy movably coupled to the support structure, the toy including a housing having a first end portion and a second end portion, and defining an interior chamber such that sound created by a user enters the second end portion of the housing, is transmitted to the first end portion of the housing through the interior chamber, and can be projected from the first end portion in multiple directions depending on the orientation of the toy with respect to the support structure;
wherein the toy is a viewing toy configured to permit a child to simultaneously look and speak into the second end portion to both view objects and project sound toward the objects;
wherein the second end portion includes an eyepiece portion into which the user looks and a mouthpiece portion into which a user speaks; and
further including a wall portion at least partially dividing the eyepiece portion from the mouthpiece portion.

54. The playstation of claim 53, further comprising a mounting member coupled to the support structure for movably supporting the toy.

55. The playstation of claim 54, wherein the mounting member permits translation and rotation of the toy with respect to the support structure.

56. The playstation of claim 53, wherein the wall portion is contoured to receive a nose of the user.

57. The playstation of claim 53, further including a light directing member positioned within the interior chamber for directing light entering the first end portion toward the second end portion.

58. The playstation of claim 57, wherein the light directing member is a mirror.

59. The playstation of claim 53, wherein the viewing toy is a periscope toy.

60. The playstation of claim 53, further including a slide coupled to the support structure.

61. A playstation comprising:
a support structure; and
a toy movably coupled to the support structure, the toy including a housing having a first end portion and a second end portion, and defining an interior chamber such that sound created by a user enters the second end portion of the housing, is transmitted to the first end portion of the housing through the interior chamber, and can be projected from the first end portion in multiple directions depending on the orientation of the toy with respect to the support structure, and light received at the first end portion of the housing is transmitted to the second end portion of the housing through the interior chamber;
wherein the toy is a viewing toy configured to permit a child to simultaneously look and speak into the second end portion to both view objects and project sound toward the objects;
wherein the second end portion includes an eyepiece portion into which the user looks and a mouthpiece portion into which a user speaks; and
wherein the mouthpiece portion includes opening including a wall portion contoured to receive a nose of the user.

* * * * *

UNITED STATES PATENT AND TRADEMARK OFFICE
CERTIFICATE OF CORRECTION

PATENT NO. : 7,253,951 B2   Page 1 of 1
APPLICATION NO. : 10/965080
DATED : August 7, 2007
INVENTOR(S) : Matthew T. Bolland It is certified that error appears in the above-identified patent and that said Letters Patent is hereby corrected as shown below:

Claim 61, lines 63-65:

change "wherein the mouthpiece portion includes opening including a wall portion contoured to receive a nose of the user" to --wherein the mouthpiece portion includes a wall portion contoured to receive a nose of the user--

Signed and Sealed this

Third Day of November, 2009

David J. Kappos
*Director of the United States Patent and Trademark Office*